Aug. 30, 1932.  O. F. OLSON  1,875,122
FISH LURE
Filed June 30, 1931
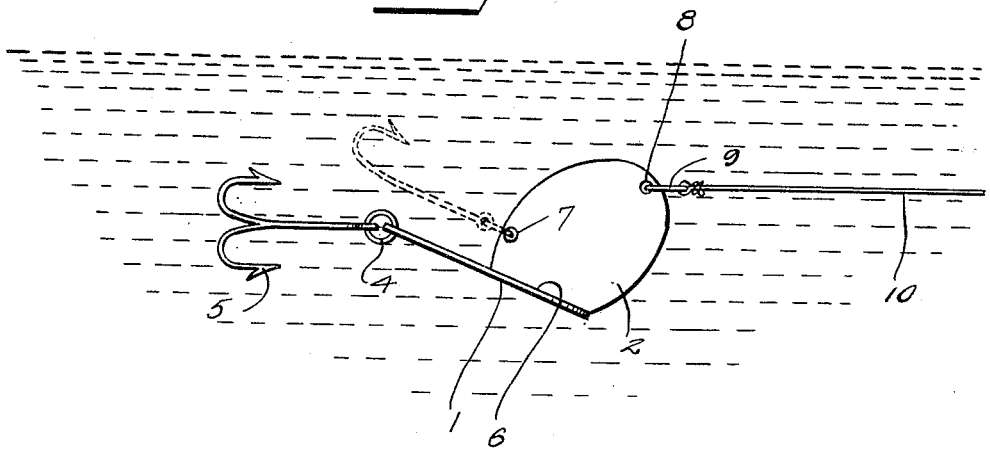
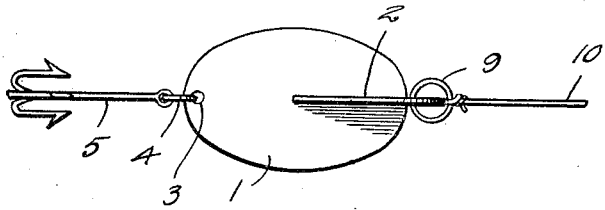
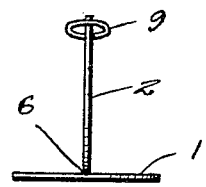
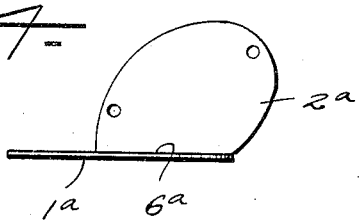
Inventor
O. F. Olson
By Watson E. Coleman
Attorney Patented Aug. 30, 1932

1,875,122

UNITED STATES PATENT OFFICE

OSCAR F. OLSON, OF FENTON, IOWA

FISH LURE

Application filed June 30, 1931. Serial No. 547,971.

This invention relates to improvements in fishing tackle, and pertains particularly to an improved lure.

The primary object of the present invention is to provide a lure of new and novel design, which, when drawn through the water, will perform erratic movements to attract and cause the fish to strike the same in the belief that the device is the object of prey.

Another object of the invention is to provide a lure having large reflecting surfaces and reflecting surfaces so arranged as to give the illusion, when the device is in operation, of a large and attractive minnow.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:
showing the position assumed by it while
Figure 1 is a view in side elevation of the device embodying the present invention showing the position assumed by it while in motion in the water.

Figure 2 is a view in top plan of the device.

Figure 3 is a view in end elevation.

Figure 4 is a view illustrating one of a variety of angles at which the longitudinal axis of the vertical member of the device may be positioned with respect to the horizontal member.

Referring more particularly to the drawing, wherein like numerals of reference indicate corresponding parts throughout the several views, it will be seen that the lure consists essentially of two plate members which are indicated by the numerals 1 and 2. The plate 1, while it does not assume a true horizontal position when in use, will be referred to as the horizontal plate for the purpose of distinguishing it from the plate 2 which is normally vertically disposed and which will be referred to as the vertical plate. The two plates 1 and 2 are here shown as being substantially elliptical in form, but it is, of course, to be understood that the invention is not to be confined to plates of this configuration as it will be readily appreciated that other forms may be used without departing from the spirit of the invention.

The elliptical plate 1 has an aperture 3 formed therethrough at one end in which is connected a ring 4 to which may be attached a hook 5. The plate 2 is cut across one end at an angle to the longitudinal axis thereof, as indicated at 6, and this angular edge is secured on the longitudinal center of the plate 1, at the end opposite that in which the aperture 3 is formed so that the plate 2 stands up vertically or is disposed in a plane which is an exact right angle to the plane occupied by the plate 1.

The plate 2 is provided with an aperture 7 adjacent its rear edge or, in other words, the edge which is disposed over the center of the plate 1, in which a hook may be connected if desired. When a hook is attached to the rear end of the plate 1 no hook would ordinarily be connected to the plate 2 and conversely when a hook is connected to the plate 2 none will be attached to the plate 1.

At the upper end of the plate 2 an aperture 8 is formed in which is connected a ring 9 for the attachment to the lure of the line 10.

As previously stated, the angle at which the vertical plate 2 is cut with respect to its long axis, that is, where the vertical plate is elliptical or in any way elongated as here illustrated, may be varied over a wide range. For example, Figure 4 shows a horizontal plate 1$^a$ having a vertical plate 2$^a$ which is of elliptical formation, in which the angle of the edge 6$^a$ is more acute with respect to the longitudinal axis than the edge 6 in the form shown in Figure 1.

It will be readily understood that by altering the angular relation between the edge 6 and the longitudinal axis of the vertical plate, the line of pull on the lure will be varied with respect to the plate 1 and consequently this plate will be made to assume angles in the water which vary in accordance with the angular relation between the edge 6 and the long axis of the vertical plate. It will thus be seen that with different types of lure constructed in accordance with the present disclosure, different motions and ranges of movement will be had.

It will also be readily appreciated that in addition to obtaining a variety of movements with the present lure, this lure may be easily and cheaply constructed.

Having thus described the invention, what is claimed is:

1. A fish lure of the character described, comprising a pair of plate members each having relatively broad plane surfaces and each being of a greater length than width, one of said plates being secured at one end to a surface of the other plate on the longitudinal center thereof and adjacent one end, said plates being right angularly related, means for attaching a hook to one of said plates, and means for attaching a line to the said one of said plates adjacent its other end.

2. A fish lure, comprising a pair of elongated plates, one thereof having an edge disposed at an acute angle with respect to its longitudinal center and secured at said edge to the other plate upon the longitudinal center of the latter and adjacent one end, the two plates being right angularly related, the said end of the said other plate constituting the front end of the lure, said plates having apertures adjacent their rear edges for the attachment of hooks thereto, and the plate having the angularly disposed edge further having an aperture adjacent its upper end for the attachment of a line thereto.

3. A fish lure, comprising a horizontal base plate, a vertical plate mounted upon said base plate in a plane extending longitudinally of the latter and upon the longitudinal center thereof, said vertical plate being of greater length than width and having its longitudinal axis inclined from the vertical, means for attaching hooks to said plates, and means for attaching a line to the upper end of the vertical plate.

4. A fish lure of the character described, comprising a pair of elongated plates, one constituting a horizontal plate and the other a vertical plate, said vertical plate being mounted at one end at the longitudinal center of the horizontal plate at one end thereof and disposed in a plane extending longitudinally thereof, said vertical plate having the said end edge angled to dispose the longitudinal axis of the vertical plate at an inclination toward the adjacent end of the horizontal plate, means for attaching hooks to said plates, and means for attaching a line to the upper end of the vertical plate.

5. A fish lure of the character described, comprising a flat member, an elongated plate disposed at right angles to the plane of the flat member and secured along one end edge to the flat member upon the longitudinal center and adjacent one end of the same to stand upright on the flat member when the lure is in use, means for attaching a hook element to the lure, and means for attaching a line to the said plate.

In testimony whereof I hereunto affix my signature.

OSCAR F. OLSON.